June 25, 1968  E. N. SHAWHAN  3,390,325
APPARATUS FOR IMPEDANCE MEASUREMENT WITH COMPENSATION
FOR CABLE LENGTH, TUBE AGING, AND THE LIKE
Filed Jan. 12, 1965
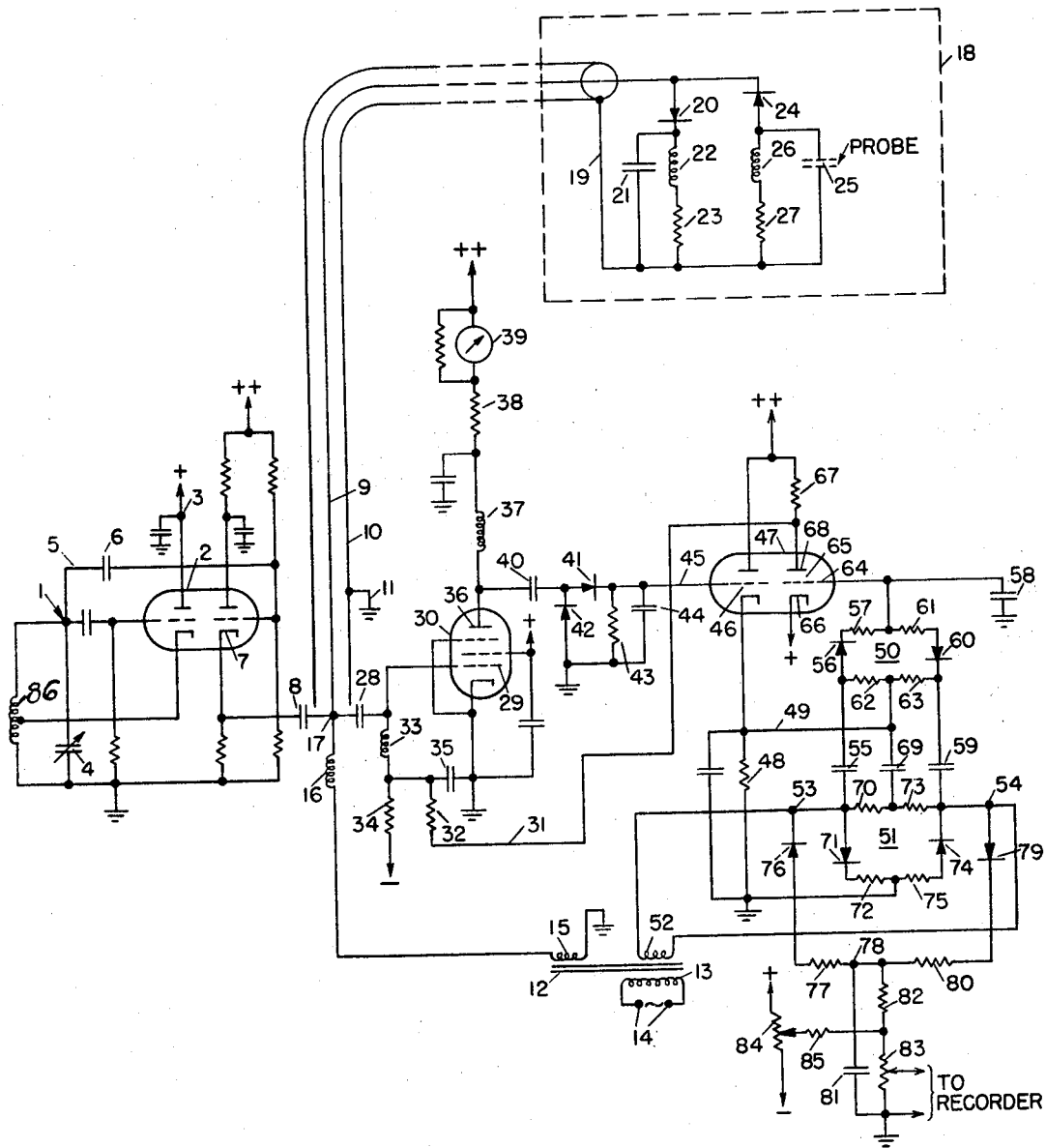
INVENTOR.
ELBERT NEIL SHAWHAN
BY
Donald R. Johnson
ATTORNEY

United States Patent Office

3,390,325
Patented June 25, 1968

1

3,390,325
APPARATUS FOR IMPEDANCE MEASUREMENT WITH COMPENSATION FOR CABLE LENGTH, TUBE AGING, AND THE LIKE
Elbert N. Shawhan, Newtown Square, Pa., assignor to Sun Oil Company, Philadelphia, Pa., a corporation of New Jersey
Filed Jan. 12, 1965, Ser. No. 424,905
4 Claims. (Cl. 324—60)

ABSTRACT OF THE DISCLOSURE

Circuitry for the measurement of impedance (capacitance) using high frequencies, in the megacycle range. Means is provided which compensates for the necessary physical length of the cable interconnecting the measuring point and the recording point. Other means is provided which compensates for changes such as those due to aging of tubes.

---

This invention relates to impedance measuring apparatus, and more particularly to apparatus for measuring small changes in capacitance.

My prior Patents 2,943,258 and 3,073,160 describe capacitance measuring apparatus which permitted the chassis carrying the electronic components of such apparatus to be located as much as several thousand feet from the point of actual capacitance measurement. This apparatus called for a relatively low measuring or excitation frequency, on the order of fifteen kilocycles per second, to obviate the requirement for criticality in cable length. Stated another way, the excitation frequency had to be such that the length of the cable represented only a fraction of a wavelength at the excitation frequency.

It is often desired to measure capacitance in "dielectric" liquids such as furfural or various alcohols, which liquids have low resistivities. For example, it may be desired to measure the moisture content of such liquids. It is accepted practice to represent such a capacitance as an ideal capacitor shunted with resistance; thus, to measure the capacitance, the impedance of this parallel combination is what has to be measured. The measurement of this impedance presents a problem at fifteen kilocycles per second; if the reactive component of the measured impedance is of the same order of magnitude as the resistive component (as it would likely be at such frequency), the measured impedance is sensitive to changes in resistance.

The range of tolerable resistivity of the "dielectric" can be extended by making the measurement at a higher excitation frequency. As the frequency increases, the impedance of the aforementioned "ideal capacitor" decreases. This causes the effect of the shunting resistance to become negligible.

Circuits previously known for high frequency measurement of capacitances located remotely from the electronic chassis required a stable excitation frequency, and also a choice of cable length (thus involving criticality in cable length) which would provide the correct terminal impedance. Moreover, in these circuits the cable formed part of the oscillator tuned circuit, and was sensitive to temperature changes, which affected its characteristic impedance; both of these mitigate against a stable excitation frequency, and a critical, constant, cable terminal impedance.

According to this invention, the high frequency measurement of capacitances is rendered practical by the effective elimination of the requirements mentioned in the preceding paragraph. The need for a fixed length of cable between the electronic chassis and the measuring point is eliminated by changing the operating frequency (i.e., the excitation frequency) to give the correct termination on whatever length of cable is required to connect such chassis to the measuring point. This is possible since at high frequencies the length of the cable or transmission line represents several wavelengths at the excitation frequency. Also, a reference capacitor is switched into the measuring apparatus (at a certain switching frequency), in place of the measuring capacitor or probe, to standardize the system and largely eliminate the effects of changes in cable characteristics. This standardization against the remote reference capacitor is effected by automatically adjusting the gain of a variable-gain amplifier in the signal-receiving portion of the electronic chassis.

A detailed description of the invention follows, taken in conjunction with the accompanying drawing, wherein the single figure is a diagram showing the wiring arrangement of elements involved in carrying out the present invention, together with an indication of the elements located at the remote measuring point.

Referring now to the drawing, there is indicated at 1 an oscillator operating at a frequency which may typically be of the order of two megacycles per second. A frequency of the order stated is desirable since it is sufficiently high to enable the measurement of capacitance in liquids which have low resistivities. The oscillator comprises the left-hand triode half of a twin triode 2 whose anode is supplied at 3 with a relatively low positive potential, on the order of twenty-five volts, for example. This low positive potential may be obtained (by way of example) from a Zener diode which is connected across the low-voltage end of the resistance-capacitance filter included in a power supply of conventional type. The circuitry of the oscillator is conventional, except that the capacitor 4 of the oscillator tank circuit is variable so that the oscillator can be tuned (varied in frequency) over a certain range, for a purpose which will be hereafter described. Alternatively, the inductor 86 of the oscillator tank circuit may be of the slug-tuned type, so that tuning of the oscillator may be effected by adjustment of such slug.

The oscillator 1 feeds its output through a connection 5 including the capacitor 6 to the input of a buffer cathode follower utilizing the right-hand triode half of the twin triode 2. Output from the cathode follower is taken from the cathode 7 thereof and fed through a capacitor 8 to terminal 17 at one end of the central conductor 9 of a coaxial cable 10 which extends from the electronic chassis at the recording point to the capacitive probe device at the remote measuring point. The cathode follower described is used to drive the cable 10 from a low impedance source.

The coaxial cable 10 may be of very considerable length, and may in fact represent several wavelengths at the excitation frequency of oscillator 1. The sheath of the coaxial cable 10 is shown as grounded at 11.

A transformer 12 has its primary winding 13 energized at 14 from a commercial alternating current supply (e.g., sixty c.p.s.). One end of a low voltage secondary winding 15 of transformer 12 is grounded, and the other end of this winding is connected through choke 16 to terminal 17, which is located at the recording point end of cable 10. By means of the connections just described, including secondary 15 and choke 16, a sixty-c.p.s. switching voltage is fed to the central conductor 9 of cable 10, along with the two-mc. excitation current fed thereto from oscillator 1, by way of the cathode follower circuit and capacitor 8.

At the end of the coaxial cable 10 remote from the portion of the electronic chassis already described (i.e., at the remote measuring point) there is an assembly 18, which may be termed a "remote transmitter." In the remote transmitter 18, the lead 19 is connected to the sheath of the coaxial cable, and thus to ground 11. Between the central conductor 9 and ground, a diode 20 is connected in series with two parallel-arranged branches, in one of which there is a capacitor 21 and in the other of which a choke 22 and a resistor 23 are connected in series. The capacitor 21 is a fixed, reference capacitor. Also connected between the central conductor 9 and ground is a diode 24 in series with two parallel-arranged branches, in one of which there is the capacitance 25 provided by the measuring probe or measuring capacitor and in the other of which a choke 26 and a resistor 27 are connected in series. It will be noted that diodes 20 and 24 are poled oppositely with respect to each other. The arrangement is such that the capacitances at 21 and 25 are of the same order of magnitude. The purpose of the entire circuit shown in the drawing is to measure the capacitance 25 which is presented between the electrodes of the measuring probe; this capacitance is proportional to some physical quantity the measurement of which is desired.

It may be noted that the sixty-c.p.s. switching voltage (which is fed to terminal 17 by way of choke 16) is applied by means of the cable central conductor 9 to the diodes 20 and 24. During the positive half-cycle of the switching voltage (i.e., the half-cycle during which central conductor 9 is positive with respect to ground), diode 20 will be conductive and diode 24 non-conductive. This situation is reversed during the negative half-cycle of the switching voltage. The result, accordingly, is that during one half-cycle of the switching voltage the capacitor 21 will be effectively in the circuit while the capacitance 25 provided by the measuring probe will be out of the circuit. This condition is reversed during the next succeeding half-cycle of the switching voltage. In effect, this provides a switching action for the capacitances included in assembly 18. As explained in my above-mentioned patents, this switching action is primarily responsible for the effective elimination of distributed capacitance in the coaxial cable as a factor in operation, since within the successive half-cycles (of the switching voltage) which reoccur in rapid sequence the cable capacitance is effectively constant. Thus, since the difference between the capacitances presented to the cable connections is essentially measured, the effect of the cable capacitance disappears. To express this in another way, the reference capacitor 21 is switched in place of the measuring probe 25 to standardize the system, and largely eliminate the effects of changes in cable characteristics.

A capacitor 28 connects the central conductor 9 of the coaxial cable with the control grid 29 of a pentode 30 arranged in an amplifier circuit. The pentode amplifier is arranged as a variable-gain amplifier whose gain is controlled by variation of the bias applied to control grid 29; for this purpose, a gain control lead 31 (which will be referred to further hereinafter) is connected through a resistor 32 and a choke 33 to grid 29. A fixed negative bias (for example, twenty-five volts negative with respect to ground) is applied to grid 29 by way of a resistor 34 and the choke 33. A capacitor 35 is connected from the common junction of items 32, 33, and 34 to ground. The anode 36 of pentode 30 is connected through a choke 37, a resistor 38, and a current meter 39 to a positive potential point on the power supply. The reading of current meter 39 can be used as an indication of the gain of the radio frequency amplifier 30.

The cable 10 is made as long as is necessary to interconnect the electronic chassis (on which tubes 2, 30, etc. are mounted) and the point of measurement (which latter is immediately adjacent the remote transmitter 18). In other words, the cable length is determined by the distance between the point of measurement and the chassis location. According to this invention, in order to have the correct termination it is not necessary to have a fixed length of cable. The cable 10 may represent several wavelengths at the excitation frequency of oscillator 1. What is done here is to adjust the frequency of oscillator 1 (by suitable adjustment of the variable capacitor 4, or of inductor 86) to make the source impedance equal to the load impedance, thus effectively eliminating the cable characteristic impedance, i.e., making the source impedance essentially independent of the cable characteristic impedance. The oscillator frequency (excitation frequency) is adjusted until near a minimum reading is observed on meter 39, indicating maximum source impedance. This gives the correct termination on whatever length of cable is required to connect the electronic chassis to the point of measurement.

The output of amplifier 30 is fed through a capacitor 40 to a peak voltmeter arrangement comprising diodes 41 and 42, a resistor 43, and a capacitor 44. As previously described, the reference capacitor 21 is switched in place of the measuring probe (capacitor) 25 at a sixty-c.p.s. rate. At the terminal 17, there appears a radio frequency wave which comprises the sum of the switching signal wave added to a radio frequency excitation wave which is generally of different amplitude in the positive and negative half-cycle periods of the switching wave. It may be assumed, for example, that the circuit including the reference capacitor 21 is switched by conductivity of its diode 20 into the circuit during the positive half-cycles of the switching wave, and, consequently, the radio frequency component of the wave at terminal 17 during the positive half-cycles represents the effect at this terminal of the reference capacitor 21. Similarly, the amplitude of the radio frequency component during the negative half-cycles of the switching wave corresponds to the effect of the measuring capacitor 25.

The amplified radio frequency voltage from amplifier 30 is rectified by the peak voltmeter arrangement 41–44 to provide on lead 45 a sixty-cycle square wave whose amplitude and relative phase represents the difference between the capacitances of probe 25 and of reference capacitor 21.

The lead 45 serves to provide input to a cathode follower including triode 46, which is the left-hand half of a twin triode 47. The cathode resistor 48 of the cathode follower is connected to ground, and the cathode of triode 46 is connected at 49 to a diode network including an upper condenser charging section 50 and a lower rectifier section 51.

The diode network referred to performs two synchronous switching functions, the synchronization (at a sixty-c.p.s. rate) being provided by means of a secondary winding 52 of transformer 12, the two ends of winding 52 being connected to respective opposite sides 53 and 54 of the diode network 50, 51. From point 53, a coupling extends through a capacitor 55, a diode 56, and a resistor 57 to the ungrounded plate of a condenser 58 whose lower plate is grounded. From point 54, a coupling extends through a capacitor 59, a diode 60 (which is poled oppositely to diode 56), and a resistor 61 to the upper, ungrounded plate of condenser 58. The previously-mentioned square-wave output of the cathode follower 46 is fed from lead 49 to diode 56 via a resistor 62, and is fed from lead 49 to diode 60 via a resistor 63.

The upper section 50 of the diode network (including the diodes 56, 60, etc.) operates as a single-pole, single-throw switch which is closed (thereby to charge condenser 58 from the square-wave output of the cathode follower 46) during the half-cycle of the switching voltage when reference capacitor 21 is connected into the circuit by operation of diode 20. As previously described, the switching voltage is applied at 53 and 54 to the diode network 50, 51. Thus, the condenser 58 is charged (during this half-cycle of the switching voltage) to a potential (voltage) proportional to the capacitance of the remote reference capacitor 21, since during this half-cycle of the switching voltage the square-wave output of the cathode follower 46 is proportional to this fixed capacitance. Since the capacitance of the reference capacitor 21 is fixed, any changes appearing in the voltage across capacitor 58 would be the result of extraneous factors, such as aging of tubes or changes in cable impedance.

As just described, the condenser 58 is charged during alternate half-cycles of the switching voltage (and specifically, during the half-cycles when reference capacitor 21 is connected into the circuit) to a standard or reference potential which is proportional to the capacitance of capacitor 21. The capacitance of condenser 58 being rather large, this condenser holds its charge during the intervening half-cycles of the switching voltage (i.e., during the half-cycles when measuring capacitor 25 is connected into the circuit). As will be explained more fully subsequently, the voltage across capacitor 58 is used as a gain control voltage for amplifier 30, the intended result being to keep the voltage across capacitor 58 substantially constant. From the above, it may be seen that the gain control voltage for amplifier 30 is set during the "reference" half-cycles of the switching voltage, and the gain of amplifier 30 is controlled in response to the value of this same set voltage, during the "measurement" half-cycles of the switching voltage.

The voltage across capacitor 58 is used to control the gain of the amplifier 30, in such a way as to keep this capacitor voltage substantially constant. If this capacitor voltage is kept substantially constant, compensation will be achieved for changes due to tube aging, and also, operation can be had with different lengths of coaxial cable. To control the gain of amplifier 30, the difference between the voltage across capacitor 58 and a reference voltage is used as a variable bias on control grid 29, in a manner which will now be described. In effect, the difference between the voltage across capacitor 58 and a reference potential is used as a variable bias on grid 29. The upper or ungrounded plate of capacitor 58 is connected to the control grid 64 of a triode 65 which is contained in envelope 47. The cathode 66 of triode 65 is connected to a positive reference voltage source, which may be, for example, the same Zener-regulated voltage source which is connected at 3 to the oscillator anode. The anode 68 of triode 65 is connected through a resistor 67 to a positive potential source, and the end of gain control lead 31 opposite to that connected to resistor 32 is connected directly to anode 68.

Thus, the triode 65 compares the voltage on its grid (which is the potential on capacitor 58) with the voltage on its cathode (which is a reference potential), and the difference (which appears at anode 68) is applied as an AVC voltage (by way of lead 31, resistor 32, and choke 33) to the amplifier grid 29, to control the gain of the pentode radio frequency amplifier 30.

The square-wave output of cathode follower 46 is fed through a capacitor 69 to the diode rectifier section 51, which operates as a single-pole, double-throw switch operated by the sixty-c.p.s. switching voltage applied at 53, 54 to the diode network. One "throw" of the aforesaid switch includes, from the lower plate of capacitor 69 to ground, the series combination of a resistor 70, a diode 71, and a resistor 72; this "throw" includes, between the same two points, another series path comprising a resistor 73, a diode 74 (poled oppositely to diode 71), and a resistor 75. Switching terminal 53 is located at the common junction of resistor 70 and diode 71, and switching terminal 54 is located at the common junction of resistor 73 and diode 74. During one half-cycle of the sixty-c.p.s. switching voltage (say the same half-cycle of the switching voltage during which reference capacitor 21 is connected into the circuit), the above-described "throw" of the single-pole, double-throw switch is operative to connect the output of cathode follower 46 to ground.

The other "throw" of the single-pole, double-throw switch includes a diode 76 and a resistor 77 connected in series between point 53 and a point 78; this other "throw" also includes a diode 79 (poled oppositely to diode 76, and also poled oppositely to diode 74, which latter is also connected to point 54) and a resistor 80 connected in series between point 54 and point 78. A capacitor 81 is connected from point 78 to ground. During the other half-cycle of the sixty-c.p.s. switching voltage (say the same half-cycle of the switching voltage during which the measuring capacitor 25 or probe is connected into the circuit), the "throw" of the single-pole, double-throw switch which includes diode 76 and 79 is operative to connect the output of cathode follower 46 to the upper or ungrounded plate of capacitor 81.

The diode rectifier section 51 (which, as previously described, operates as a single-pole, double-throw switch) thus serves as a peak-to-peak rectifier, wherein the D.C. output voltage (across capacitor 81) is a measure of the difference between the capacitances of the remote reference capacitor 21 and of the remote capacitance 25 being measured.

In order to record the voltage across capacitor 81, a resistor 82 is connected in series with a "span" adjustment potentiometer 83 across capacitor 81, and a recorder (not shown) is connected between ground and the movable arm on potentiometer 83. To provide a "zero" adjustment, a "zero" adjustment potentiometer 84 is connected between a positive voltage source and a negative voltage source. By way of example, the negative source may be the same as that to which the lower end of resistor 34 is connected, and the positive source may be the same as that to which cathode 66 is connected. A resistor 85 is connected between the movable arm on potentiometer 84 and the common junction of resistors 82 and 83. The recorder "zero" and "span" controls 84 and 83, respectively, operate independently.

The invention claimed is:

1. An impedance measuring apparatus comprising a pair of impedors one of which is fixed and the other of which is variable, the impedances of said impedors being of the same order of magnitude; a common transmission line, means electrically coupling one end of said line to said impedors, said coupling means including means for switching alternately, into electrical connection with said one end of said line, said one impedor and said other impedor; means electrically connected with the other end of said line for providing through said line alternating excitation current to said impedors, said excitation current having a frequency such that the length of the line represents several wavelengths; means for varying the frequency of said excitation current to provide a desired terminal impedance for said line, means including a variable-gain amplifier having its input coupled to said other end of said line for developing a first voltage proportional to the impedance of said one impedor; means for controlling the gain of said amplifier to keep said first voltage substantially constant, means including in part said amplifier for developing a second voltage proportional to the impedance of said other impedor; and means for measuring the difference between said first and second voltages.

2. Apparatus according to claim 1, wherein the impedances provided by said impedors are capacitive.

3. Apparatus as set forth in claim 1, wherein said voltage developing means includes a detector synchronized with the switching means to provide said first and second voltages.

4. Apparatus in accordance with claim 1, wherein said gain-controlling means comprises a capacitor charged to a voltage proportional to the impedance of said one impedor, and a connection between said capacitor and a gain-controlling element of said amplifier.

References Cited

UNITED STATES PATENTS

| | | | |
|---|---|---|---|
| 2,864,056 | 12/1959 | Barkas et al. | 324—57 |
| 2,943,258 | 6/1960 | Shawhan | 324—61 XR |
| 3,073,160 | 1/1963 | Shawhan | 324—61 XR |
| 3,243,699 | 3/1966 | Kummer | 324—57 |

RUDOLPH V. ROLINEC, *Primary Examiner.*

E. E. KUBASIEWICZ, *Assistant Examiner.*